United States Patent [19]

Woborschil

[11] 4,354,184

[45] Oct. 12, 1982

[54] DISPLAY SYSTEM FOR LOCALIZING REGIONS IN A MIXED TEXT & PICTURE DISPLAY

[75] Inventor: Walter Woborschil, Munich, Fed. Rep. of Germany

[73] Assignee: Siemens Aktiengesellschaft, Berlin & Munich, Fed. Rep. of Germany

[21] Appl. No.: 190,232

[22] Filed: Sep. 24, 1980

[30] Foreign Application Priority Data

Sep. 28, 1979 [DE] Fed. Rep. of Germany ....... 2939489

[51] Int. Cl.³ .............................................. G09G 1/16
[52] U.S. Cl. .................................. 340/709; 340/725; 340/731
[58] Field of Search ................ 340/709, 710, 731, 715

[56] References Cited

U.S. PATENT DOCUMENTS 3,576,574  4/1971  Baskin et al. ................... 340/731 X
3,868,673  2/1975  Mau et al. ............................ 340/709
4,015,846  4/1977  Runte et al. ..................... 340/725 X
4,228,430  10/1980 Iwamura et al. ..................... 340/709
4,259,725  3/1981  Andrews et al. ................... 340/709

OTHER PUBLICATIONS

*Elektronik*, 1978, Heft 4, p. 204.

*Primary Examiner*—David L. Trafton
*Attorney, Agent, or Firm*—Hill, Van Santen, Steadman, Chiara & Simpson

[57] ABSTRACT

A system for localizing a region of a display incorporates a plurality of resettable counters for defining the position and extent of a cursor in two dimensions. Data is set into the counters periodically at the beginning of each frame, or at the beginning of each scanning line, so that the size and shape of the cursor is selectable, as well as its position on the display. When the data is modified during successive time periods, the cursor can be made to progressively reduce its size so as to indicate a point, and/or to progressively change its location.

15 Claims, 5 Drawing Figures

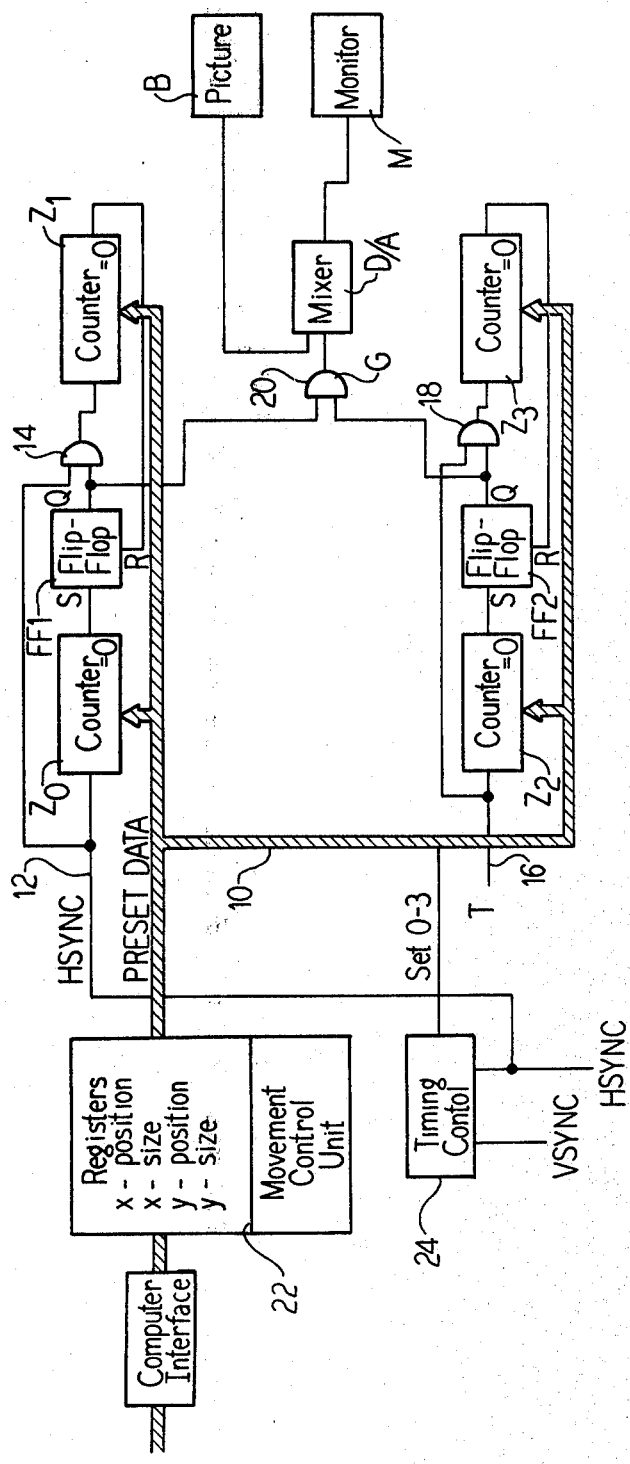

DISPLAY SYSTEM FOR LOCALIZING REGIONS IN A MIXED TEXT & PICTURE DISPLAY

BACKGROUND

1. Field of the Invention

The present invention relates to a system for the localization of regions in a mixed text-picture display and more particularly to such displays in which information is displayed with two brightness levels.

2. The Prior Art

In connection with the processing of display patterns having mixed text and picture elements, an operator must have aids available which make possible a localization of both the text elements, and elements of the picture. In a case of text processing, such an aid is generally known as a cursor, which is usually in the form of a rectangle.

It is also necessary to have a means for determining the placement of picture elements which do not cover the entire display surface, such as handwriting, sketches and the like.

The term "cursor" refers to a temporary marking on a display screen which emphasizes to a user, in an optical manner, a momentarily important location on the picture. In the case of data display devices, it is for example a dash or a brighter appearance of the character or line which is to be processed next. Such apparatus is described in "Elektronik", 1978, Pamphlet 4, Index Card Number 399.

BRIEF DESCRIPTION OF THE INVENTION

The principal object of the present invention is to provide a novel shape of a cursor by which localization of individual points on the display screen is made possible.

Another object of the present invention is to provide a cursor which is easily recognizable independently of the information presented in the display.

A further object of the present invention is to provide a system for localizing regions in a mixed text-picture display where the display screen presents the information with two brightness levels.

In accordance with one embodiment of the present invention, the region to be localized is defined by means of a cursor having a rectangular shape serving as the background for information which remains visible as either brighter or darker than normally presented information. The size of the rectangular cursor is controllable so that the cursor assumes the size of the rectangular surface to be located or the size of the character to be located. For the location of a point, the cursor pulsates, along with a step-by-step reduction of its surface area, moving toward the point to be located.

The present invention has the advantage that the cursor is suitable for the location of random regions on the display, including character of text or points, with picture surfaces which are to be localized being brightened or darkened in such a manner that the picture information remains visible.

These and other objects or advantages of the present invention will become manifest by an examination of the following description and the accompanying drawings.

BRIEF DESCRIPTION OF THE DRAWINGS

Reference will now be made to the accompanying drawings in which:

FIG. 4 is a functional block diagram of an exemplary circuit arrangement for realizing the cursor of the present invention.

DESCRIPTION OF THE PREFERRED EMBODIMENT

Figure 1:
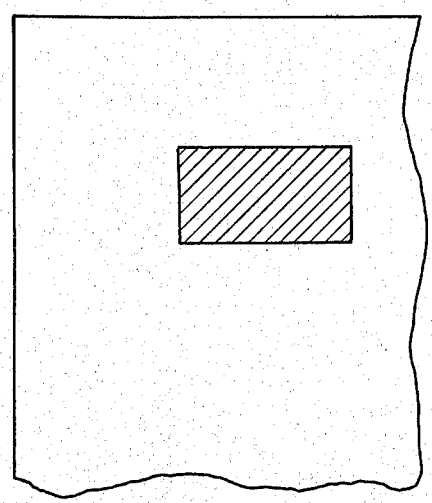
FIG. 1 is a schematic illustration of the rectangular cursor having a size corresponding to the surface of the display which is to be localized.
Figure 2:
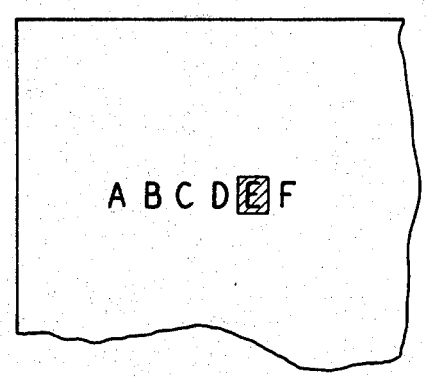
FIG. 2 is a schematic illustration of the cursor with an area corresponding to a text character to be localized.

The cursor of the present invention is illustrated in diagrammatic form in FIG. 1, where the cursor is illustrated as a shaded rectangle. The size and shape of the rectangle may be controlled so as to designate a particular localized area of the display.

Figure 3:
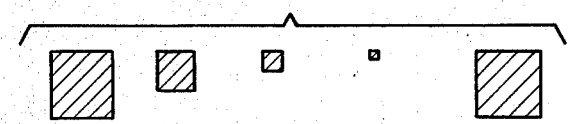
FIG. 3 is a schematic diagram showing the principle by which the cursor pulsates, along with a step-by-step reduction of its size, moving toward a point which is to be located.

In the case of a character being localized, the cursor assumes the form of a square surrounding the character, with the character being visible with the cursor serving as the background for the character. In FIG. 3, the cursor is illustrated at five successive moments, which illustrate the manner in which the cursor reduces its size in order to indicate a point, shown as the fourth time position of FIG. 3. In the fifth time position, the cursor resumes a large size, after which the reduction in size, during successive time intervals, is repeated. The cursor may pulse on and off, as it changes size, in order to be more noticeable to an operator.

Figure 5:
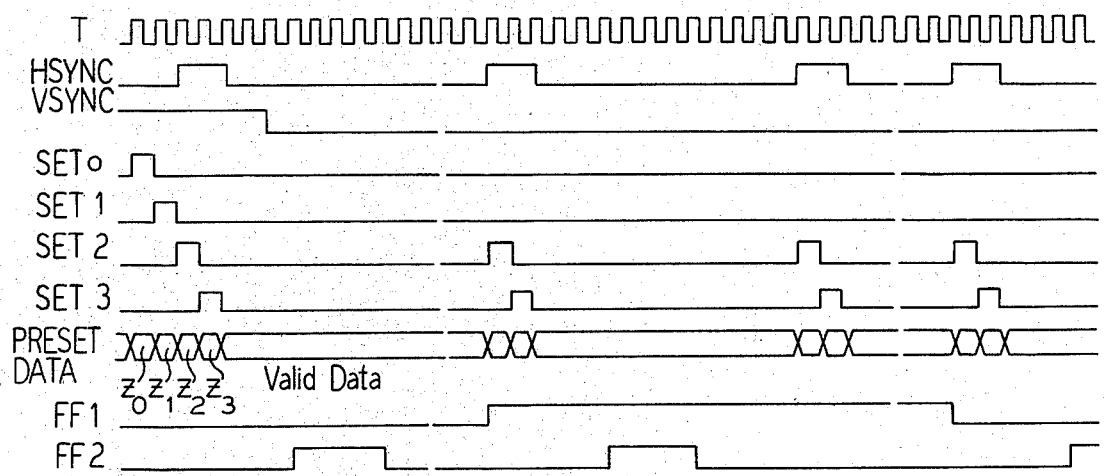
FIG. 5 is a timing diagram for the exemplary circuit arrangement.

In FIG. 4, a schematic diagram of apparatus for generating the cursor is illustrated. Four presettable digital counters $Z_0$ through $Z_3$ are incorporated, and each of the counters is periodically preset by signals Set 0-3. The counters $Z_0$ and $Z_1$ are preset at the beginning of each frame of the display caused by signal VSYNC and determine respectively the position and length of the cursor rectangle, measured in a direction perpendicular to the scanning line. The counters $Z_2$ and $Z_3$ are set at the beginning of each scan line caused by signal HSYNC and determine respectively the position and length of the cursor rectangle in the direction along the scan line. The counters are preset at the proper times according to FIG. 5 by means of logic 24 and a data bus 10 illustrated in shaded form and which is labeled "PRESET DATA, SET 0-3" in FIG. 4. The counter $Z_0$ is thereafter counted down by sync pulses on line 12, occurring at the beginning of each scanning line, and when the counter $Z_0$ reaches zero, it produces an output signal which sets the flip-flop $FF_1$. Thereafter, sync pulses are supplied to the counter $Z_1$ through an AND-gate 14 and when the counter $Z_1$ is counted down to zero, the flip-flop $FF_1$ is reset. Accordingly, the Q output of the flip-flop $FF_1$ is high only during the period that the display screen is being scanned with lines passing through the rectangular cursor area.

The counter $Z_2$ is counted down with pulses from a pulse generator which are supplied to a line 16, there being a predetermined number of such pulses per line. When the counter $Z_2$ reaches zero, a flip-flop $FF_2$ is set, after which the counter $Z_3$ is counted down by pulses supplied through an AND-gate 18. When the counter $Z_3$ is counted to zero, the flip-flop $FF_2$ is reset. Accordingly, the Q output of the flip-flop $FF_2$ is high only during the period of each scanning line corresponding to the position of the cursor rectangle relative to its scanning lines.

An AND-gate 20 receives as inputs the Q outputs of both flip-flops, and the signal is supplied to a video mixer unit D/A which mixes the signal with a signal representative of picture information originating from the unit B. The output of the video mixer is applied to the video monitor M, so that the picture information and the rectangular cursor are additively displayed on the monitor.

It is apparent that the position of the cursor is dependent on the quantities preset into the counters $Z_0$ and $Z_2$, and that the vertical and horizontal dimensions of the cursor are determined by the quantities preset into the counters $Z_1$ and $Z_3$. The quantities can all be determined independently, so as to select any desired size and shape of the rectangle, and to position it anywhere in the display area. Its position and/or size can be varied during successive frames of the display, by changing the quantities which are preset into the counters $Z_0$–$Z_3$ to achieve the desired effect. These quantities are stored in registers X-position, X-size, Y-position, and Y-size, controlled by computer output and a motor control unit 22, e.g. a joy stick. For example, the decreasing size of the cursor as shown in FIG. 3, is achieved by decreasing the quantity preset into the counters $Z_1$ and $Z_3$ during successive time periods. In order to achieve pulsing, one or both of the counters $Z_0$ and $Z_2$ is set to its maximum count during periods in which no cursor display is desired. Such settings are alternated with settings which correspond to the desired position of the pulsing cursor. In addition, the cursor can be illustrated as moving by periodically changing the quantities preset into the counters $Z_0$ and $Z_2$, depending on whether a vertical or horizontal movement, or both, is desired.

It will be appreciated that the output level of the signal from the AND-gate 20 is selected to give the cursor a brightness level different from that of the characters of text which are to be located, so that the text characters are not obliterated and obscured.

Although in the above, the cursor is illustrated as being rectangular, it will be apparent that a different form of cursor may be generated such as a triangle or an arrow, for example, by changing the quantities which are preset into the counters $Z_2$ and $Z_3$ as required, at the beginning of each scan line of the display image.

In operation, the operator may define the size and position of the rectangular cursor by first using the point mode, and moving the point-indicating cursor to the point corresponding to the upper left-hand corner of the desired rectangular cursor. This movement may be carried out in the well-known manner, using a joy stick or other movement controls 22. This movement is effected by presetting counters $Z_0$ and $Z_2$ with progressively larger or smaller quantities, in dependence on the desired direction of movement left and right, and up and down, under control of the joy stick. When the point cursor reaches the position desired for the upper left-hand corner of the rectangular cursor, the operator operates a control (not shown) which fixes the quantities preset into the counters $Z_0$ and $Z_2$. Thereafter, the joy stick controls the presetting of the counter $Z_1$ and $Z_2$, with progressively larger (or smaller) quantities, in response to movement of the joy stick in the known manner, which establishes the size and shape of the rectangular cursor. The quantities derived in this way, for presetting the counters, may be stored for later use by a program control, which causes the cursor to appear at the selected location and with the selected size, when required.

Although the present invention has been described in the foregoing in terms of a display screen which employs a scanning mechanism for scanning plural parallel lines in succession, it will be apparent that the present invention may be employed in any display system. Various other modifications and additions may be made to the present invention without departing from the essential features of novelty thereof, which are intended to be defined and secured in the appended claims.

What is claimed is:

1. A system for the localization of a region of a display device for displaying a mixed text-picture, comprising means for scanning the region to be localized, means for generating a cursor signal during scanning of such region, means for moving the position of said cursor in two dimensions in the picture of said display device, means for mixing said cursor signal with picture information so that a rectangular cursor area appears with a different brightness than the information which is presented normally, means responsive to a data input for controlling the length and width of said cursor area, whereby the size and shape of said cursor can be modified by modifying said data input, and means for periodically changing the data input to progressively alter the length and width of said cursor area.

2. Apparatus according to claim 1, including means for reducing the size of said cursor in a series of steps in order to locate a point on said display.

3. Apparatus according to claim 2, including means for successively changing the position of said cursor so that said cursor moves toward said point.

4. Apparatus according to claim 2, including means for pulsing said cursor by periodically removing it from the display.

5. Apparatus according to claim 1, including means for determining the size of the cursor incorporating means for defining the upper left corner of the cursor and means operated subsequently for determining the size and shape of said cursor.

6. Apparatus according to claim 1, incorporating first and second presettable counters for determining the position and length of the cursor in a direction perpendicular to a scan line, third and fourth counters for determining the position and length of the cursor in the direction along the scan line, and output means controlled by said counters for developing a cursor identifying signal only while said cursor is being scanned.

7. Apparatus according to claim 6, including means for presetting said first and second counters during each frame of said display, and means for presetting said third and fourth counters at the beginning of each scanning line.

8. Apparatus according to claim 7, including means for mixing said cursor identifying signal with a picture signal, said signals being mixed additively so that said cursor appears with a different brightness than the elements of said picture signal.

9. Apparatus according to claim 1 including means for changing the data presented to said data input at regular intervals.

10. A method of locating regions on a display screen comprising the steps of; generating a cursor area in a form of a rectangular surface appearing brighter or darker than normally presented information on said display screen, positioning said cursor at a location anywhere on said display screen, presenting data to a data input for controlling the length and width of said cursor area, whereby the size and shape of said cursor can be modified by modifying said data input, and periodically changing the data input for progressively altering the size of said cursor.

11. The method according to claim 10, including the step of periodically changing the data input whereby said cursor progressively reduces its size so as to indicate a point on said display.

12. The method according to claim 11, including the step of periodically changing the data, whereby the location of said cursor moves toward said point on the display.

13. The method according to claim 10, including defining the size and shape of said cursor by first defining the upper left-hand corner of said cursor, and afterwards, defining the lower right-hand corner of said cursor, for generating data for controlling the display of said cursor.

14. The method according to claim 10, including the step of using said point mode cursor for locating the position of a cursor surface on said display screen, including the steps of locating a point on said display with said cursor in the point mode, and thereafter displaying a cursor surface at a position on said display corresponding to said point.

15. The method according to claim 10, including the step of changing the data presented to said data input at regular intervals.

* * * * *